United States Patent [19]
Vickers

[11] Patent Number: 5,775,489
[45] Date of Patent: Jul. 7, 1998

[54] MULTI-MEDIA LIBRARIAL STORAGE SYSTEM

[76] Inventor: Thomas M. Vickers, 3303 Arendell St., Moorehead City, N.C. 28557

[21] Appl. No.: 747,526

[22] Filed: Nov. 12, 1996

[51] Int. Cl.$^6$ .......................... B65D 85/57; B65D 85/575
[52] U.S. Cl. ........................ 206/307.1; 206/387.14; 206/472
[58] Field of Search .................... 206/307.1, 387.13, 206/472, 232, 311, 312, 313

[56] References Cited

U.S. PATENT DOCUMENTS

| | | | |
|---|---|---|---|
| 2,141,952 | 12/1938 | Hassenfeld | 206/472 |
| 2,603,405 | 7/1952 | Frankenstein | 206/472 |
| 3,583,729 | 6/1971 | DeGroot | 206/387.13 |
| 3,698,544 | 10/1972 | Growney | 206/472 |
| 4,765,466 | 8/1988 | Ivey | 206/472 |
| 4,778,051 | 10/1988 | Schaub et al. | 206/387.13 |
| 4,789,058 | 12/1988 | Blaney | 206/232 |
| 4,793,477 | 12/1988 | Manning et al. | 206/387.13 |
| 4,951,814 | 8/1990 | Belmont | 206/472 |
| 5,248,037 | 9/1993 | Kornberg et al. | 206/472 |
| 5,515,972 | 5/1996 | Shames | 206/472 |

*Primary Examiner*—Paul T. Sewell
*Assistant Examiner*—Anthony Stashick
*Attorney, Agent, or Firm*—Mills Law Firm PLLC; Clifford F. Rey

[57] ABSTRACT

A multi-media librarial storage system including a plurality of individual book-like storage containers is described. Each individual book-like storage container within the system is adapted to receive a plurality of interchangeable receiver inserts configured and dimensioned to retain a variety of multi-media cassette packages such as the common Philips audio cassette, video tape packages of the familiar VHS, VHS-C/8mm video cassettes, digital audio tape (DAT) cassettes, CD-ROMs, computer software diskettes, and other related multi-media items. The receiver inserts disposed within the storage containers are fabricated from sheets of foldable materials such as paperboard using cut and fold techniques common to the packaging industry. Interchangeability among a plurality of differently configured and dimensioned receiver inserts is achieved by the use of integral locking tabs formed on the receiver inserts which are installed within mating slots formed within the individual storage containers. Detachable fastening means are interposed between the interchangeable receiver inserts and the interior surfaces of the storage containers to secure the same in their functional position. The multi-media librarial storage system is provided with alpha/numeric labels which are applied to the book-like spine of the storage containers to identify items stored therein and to facilitate retrieval. The multi-media librarial storage system is provided with a companion index volume wherein the user may identify and catalog items stored within the system by the identificaton labels.

15 Claims, 15 Drawing Sheets

MULTI-MEDIA LIBRARIAL STORAGE SYSTEM

BACKGROUND OF INVENTION

1. Field of Invention

This invention relates to storage containers for the storage of audio or video cassettes, CD-ROM discs, computer diskettes and other multi-media items and, more particularly, to a book-like container for storing, identifying, and organizing such multi-media items into a librarial storage system.

Book-like containers for receiving audio and video cassettes are well known to those skilled in the art. In the conventional practice, such a book-like container typically includes front and rear covers with a flexible spine disposed therebetween. The front and rear covers and the spine are integrally formed from a suitable material with the spine being scored or otherwise shaped to allow movement of the covers relative to the spine.

Such a conventional cassette container defining a pocket therein and being adapted to receive such a cassette is permanently attached by fastening means to an interior surface of the rear cover. An opening in the cassette receptacle is oriented to face an interior surface of the spine with the front cover free to fold over the same such that the whole assembly presents the appearance of a book.

An example of such an audiocassette tape holder is disclosed by U.K. Patent No. 2,030,545 to Hudson, et al. This patent discloses a cassette holder for magnetic cassette tapes consisting of two covers with a spine disposed therebetween such that the folded cassette holder resembles a book.

Another example of a storage container is shown in U.S. Pat. No. 4,765,466 to Ivey. This patent discloses a folio made of a card material for receiving an article that includes a sheet folded to form front and rear panels in a spine. This article receiving receptacle is mounted on the inside of the rear panel and a clasp is received in a cut-out on the rear wall of the receptacle for completing the assembly.

Although the prior art includes various types of containers for the storage of audio or video cassettes, there is a need for a librarial storage system for storing, identifying and organizing the proliferation of audio and video cassette tapes, computer diskettes, CD-ROMS and other related items having different configurations within a storage system that is uniform in appearance and function. Thus, the present invention has been developed to provide a multi-media librarial storage system to solve this problem and other shortcomings of the prior art.

2. Description of Related Art

U.S. Pat. No. 4,253,567 to Arthur R. Goldammer discloses a container adapted to hold a plurality of tape cassettes in a protected environment that protects substantially the complete cassette from the outside atmosphere. The container also allows the user to insert the cassette in any position or direction and hence does not have a predetermined or preformed position making the container more functional and easy to use by the consumner.

U.S. Pat. No. 4,287,989 to Edward B. plummer discloses a storage container for magnetic tape cassettes of the type used in home and auto stereos. The storage container contains one or more protuberances which are capable of being located in association with the capstan locating holes of the cassette to fixedly maintain the cassette within the storage container.

U.S. Pat. No. 4,307,806 to Carol A. Haubert discloses a package for protectively containing a tape cassette comprising a book-like container and an integral cassette compartment foldably formed in cooperative relationship with one another without the use of adhesives.

U.S. Pat. No. 4,765,466 to Charles W. Ivey discloses a folio of card material for receiving an article that includes a sheet folded to form front and rear panels and a spine.

U.S. Pat. No. 4,925,027 to paul F. Roze discloses a storage container for cassette tapes including an opened top casing member with a cover pivotally connected to one sidewall thereof and adapted to close the storage compartment. Within the storage compartment, a plurality of parallel, spaced-apart retaining members are provided for receiving an item to be stored.

U.S. Pat. No. 4,951,814 to Richard E. Belmont discloses a tape storage container configured to retain tape cassettes in their protective storage cases of different sizes. More specifically, the storage container is of a configuration and dimension to retain either two digital audio tape (DAT) cassettes, two storage cases or one cassette together with one storage case.

U.S. Pat. No. 4,981,211 to Mary K. Janek discloses an improved video tape cassette storage container. Attached to the cover of the video tape cassette storage container is a photograph mat. The photograph mat may include a photograph that is relevant to the material contained on the video tape located therein.

U.S. Pat. No. 5,088,602 to Mark B. Heyderman discloses a booklike storage container for audio or video cassettes which facilitates easy removal of the cassette from the receptacle.

U.S. Pat. No. 5,165,541 to Kiyoo Morita discloses a cassette tape storing case which can accommodate a plurality of cassettes which is generally thin in structure and which provides handy storage.

U. K. Patent No. 2 030 545 A to Stanley George Hudson et al, discloses a book-like cassette holder for magnetic cassette tapes consisting of front and back covers with a spine disposed therebetween. The covers and the spine are integrally formed from a plastic material and adapted to allow movement of the covers relative to the spine. A conventional cassette box is fixed on an interior surface of the rear cover with the opposite cover free to lie over the box such that the whole assembly presents the appearance of a book.

German Patent No. DE 3151649 A1 discloses a book-like photograph storage case having front and rear covers and a flexible spine disposed therebetween. Attached to an interior surface of the rear surface of the rear cover is an outer box that is designed to accept an insert compartment which holds the photographs for safe storage.

Finally, Japanese No. 1-124585(A) discloses a book-like cassette receiving case adapted to receive a cassette tape within a conventional frame pocket. A shock absorbing member is disposed about the frame pocket to protect the cassette tape from external force encountered during handling.

SUMMARY OF THE INVENTION

After much research and study of the above-mentioned problem, the present invention has been developed to provide a multi-media librarial storage system which utilizes a plurality of book-like storage containers having a uniform appearance and being adapted for storing, identifying and organizing various multi-media items which differ in their size and configuration.

More particularly, the book-like storage containers of the present invention are adapted to receive such multi-media items as audio and video cassette tapes, such as the common quarter-inch philips audio cassette, video tape packages of the familiar VHS, BETA, VHSC, and 8 mm video cassettes, audio CDs, computer diskettes, CD-ROM discs and other related multi-media items.

The present invention accomplishes this by providing a plurality of interchangeable receiver inserts which are configured and dimensioned to accept a plurality of the respective multi-media items described hereinabove.

A particularly salient feature of the multi-media librarial storage system of the present invention is that a book-like storage container of a uniform size and appearance is adapted to receive a plurality of interchangeable receiver inserts that are configured and dimensioned to accept various different multi-media items.

Thus, a collection of storage containers uniform in size and appearance will present visually as a matched set of books in the home or office library while internally comprising any desired arrangement of multi-media items.

In addition, the multi-media librarial storage system is provided with a cumulative index wherein the user documents each item in the system and assigns a self-adhesive label including indicia to the spine of each storage container in the manner of a library catalog. Thus, each multi-media item may be identified as it is added to the library and be conveniently located for future reference.

In view of the above, it is an object of the present invention to provide a multi-media librarial storage system wherein a plurality of multi-media items having different dimensions such as audio and video cassettes, CDs, computer diskettes and similar items can be stored, identified and organized in a home or office library.

Another object of the present invention is to provide a plurality of book-like storage containers having a uniform size and appearance which are adapted to receive various multi-media items of different size and configuration by means of a plurality of interchangeable receiver inserts installed within said storage containers.

Another object of the present invention is to provide a multi-media librarial storage system wherein each individual item may be identified and indexed in the manner of a library catalog to facilitate retrieval thereof Other objects and advantages of the present invention will become apparent and obvious from a study of the following description and the accompanying drawings which are merely illustrative of such invention

DETAILED DESCRIPTION OF INVENTION

Figure 1:
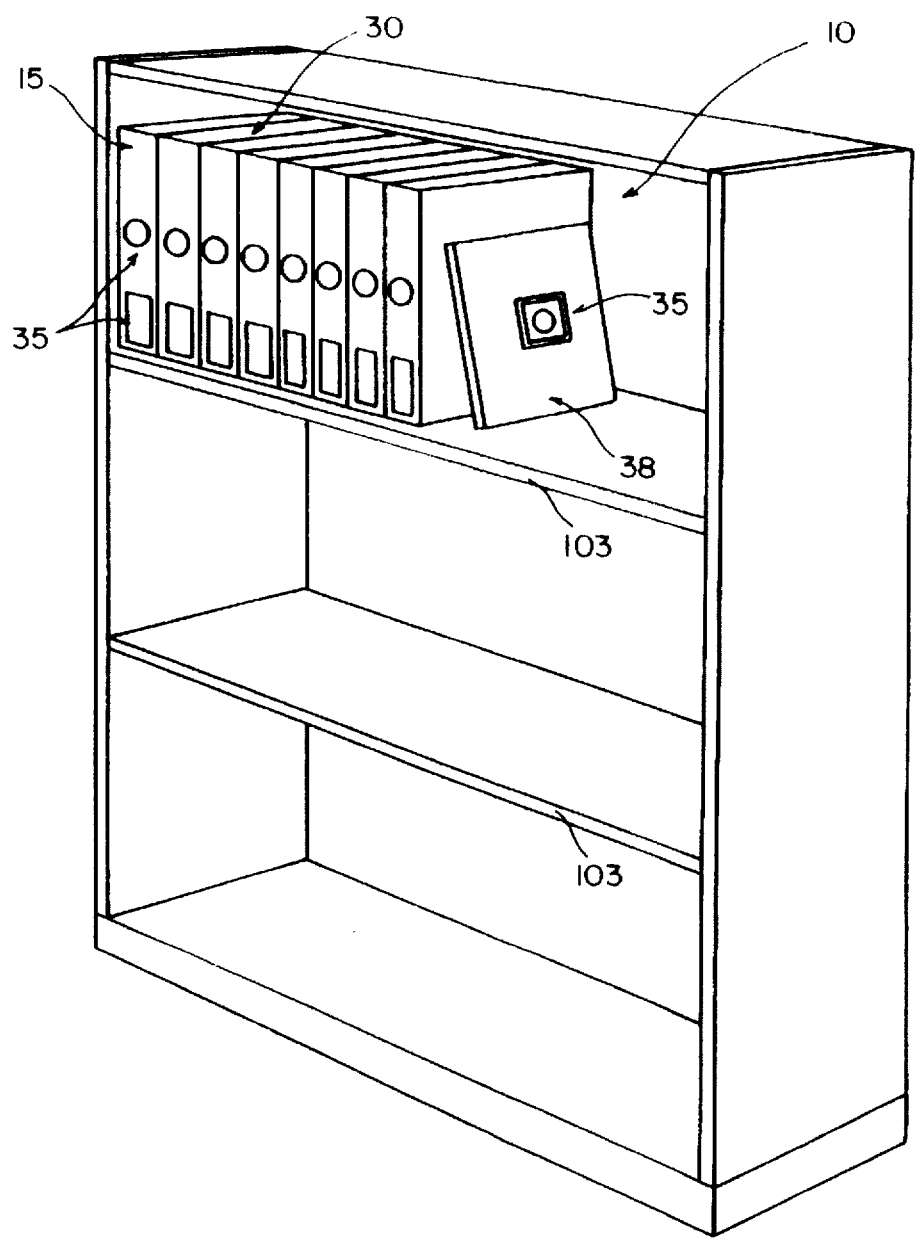
FIG. 1 is a perspective view of the multi-media library system presenting the appearance of a matched set of books.

With further reference to the drawings, there is shown therein a perspective view of the multi-media librarial storage system in accordance with the present invention, indicated generally at 10 and illustrated in FIG. 1. It can be seen that in the embodiment shown in FIG. 1, the multi-media librarial storage system 10 presents the external appearance of a conventional matched set of books.

The multi-media librarial storage system 10 includes a plurality of individual, book-like storage containers, indicated generally at 15, adapted to receive a plurality of detachable receiver inserts, indicated generally at 30, an index volume, indicated generally at 38, and a plurality of self-adhesive decals 35.

Figure 2:
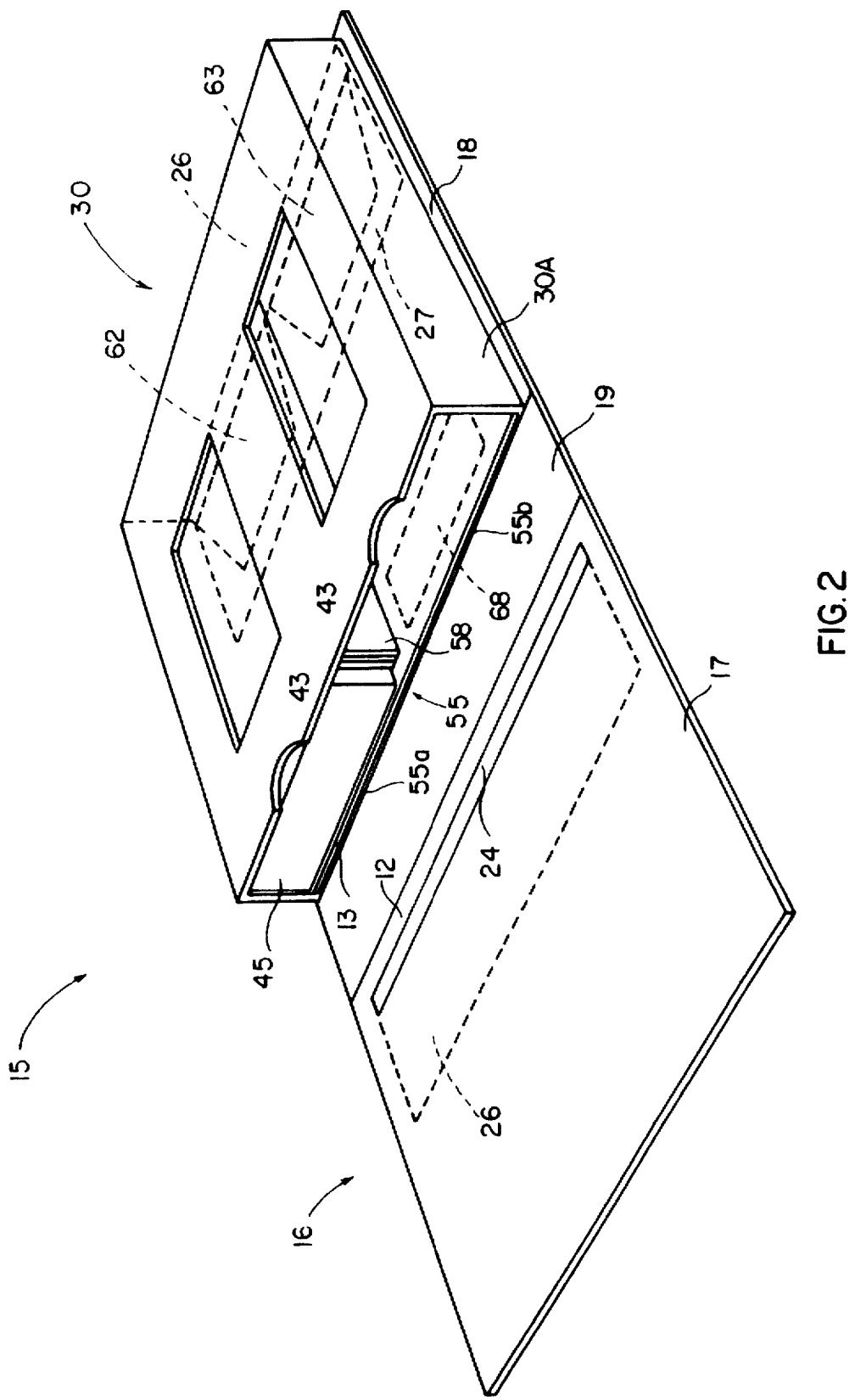
FIG. 2 is a perspective view of an embodiment of the multi-media storage container of the present invention including a detachable receiver insert adapted for VHS video cassettes.

Turning now to FIG. 2, the details of the construction and method of use of the multi-media librarial storage system 10 will be described.

The generally rectangular, book-like storage container 15 comprises a universal binder, indicated generally at 16, and an interchangeable receiver insert, indicated generally at 30.

The universal binder 16 includes front and rear covers 17 and 18 respectively, which are integrally formed with a spine 19 in a conventional manner. The front cover 17 is foldably connected to spine 19 by hinge 12 and rear cover 18 is foldably connected to spine 19 by hinge 13.

In the preferred embodiment, the universal binder 16 is fabricated from a single sheet of a suitable paper material having a proper hardness in order to simplify manufacturing the same. Thereafter, the entire binder 16 is covered by a suitable material such as cloth, paper, or leather to provide a finished appearance.

Figure 3:
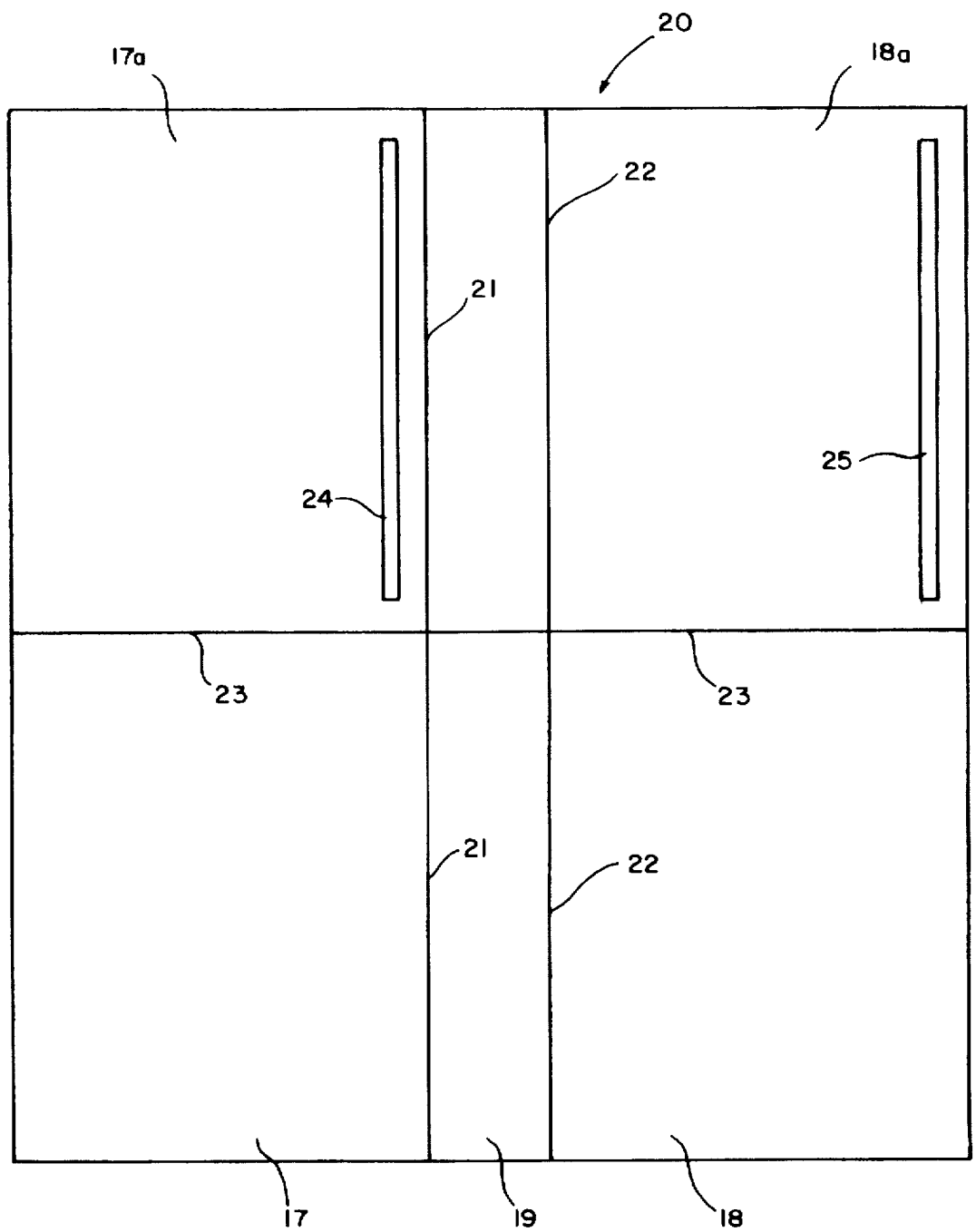
FIG. 3 is a top plan view of a blank for the manufacture of the universal binder of the present invention.

Turning now to FIG. 3, the details of the construction of the binder 16 will be described. As previously stated, the binder 16 may be fabricated from a single sheet or blank.

indicated generally at 20, of foldable material such as paperboard, for example.

The blank 20 includes at one end thereof the front cover 17. An inner longitudinal edge portion of front cover 17 is integrally connected to an adjacent longitudinal edge of spine 19 along a fold line 21 corresponding to hinge 12, where the blank 20 is folded and pivotally connects the front cover 17 to the spine 19. The opposing longitudinal edge portion of spine 19 is integrally connected to an adjacent longitudinal edge of rear cover 18 along a fold line 22 corresponding to hinge 13.

In the preferred embodiment, the blank 20 is provided with one or more elongated slots 24 and 25 which are cut into the respective upper portions 17a and 18a thereof corresponding to the inner surfaces of front and rear covers 17 and 18 as shown in FIG. 3. Slots 24 and 25 are adapted to receive interlocking tabs formed on the interchangeable receiver inserts 30 as described hereinafter in further detail.

Figure 4:
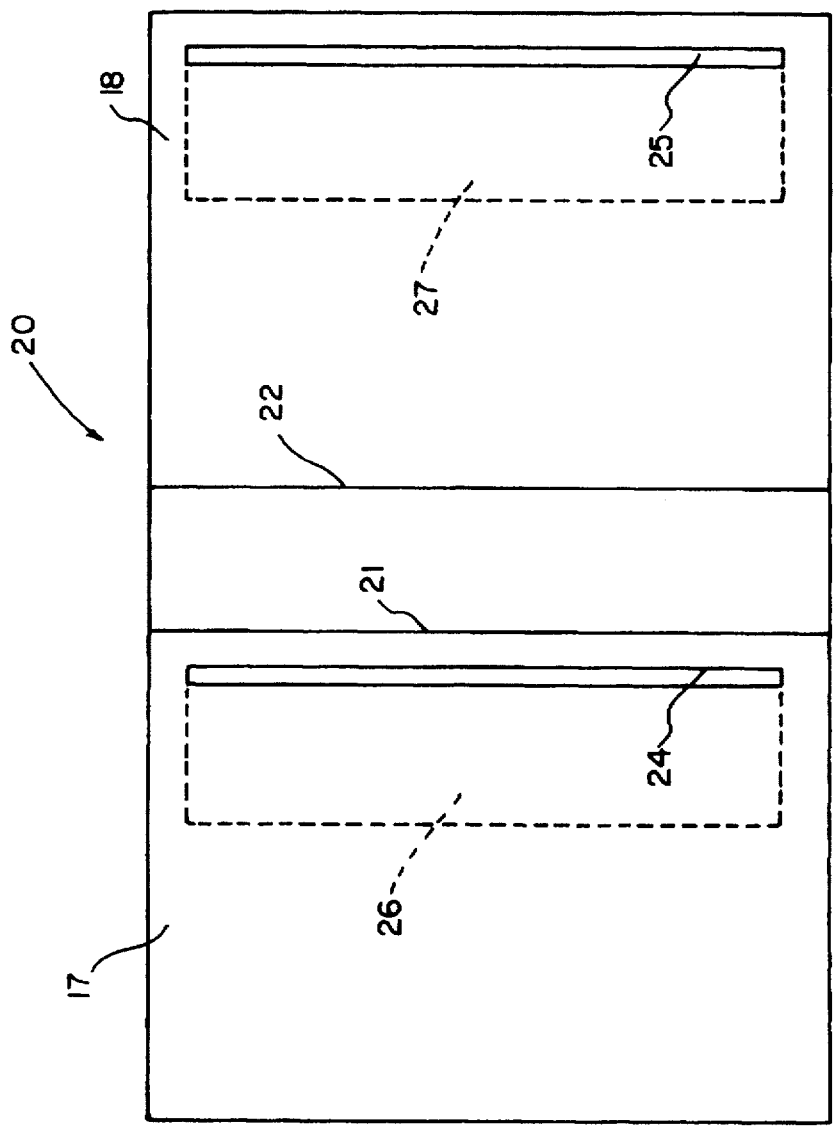
FIG. 4 is a top plan view of a blank for the manufacture of the binder shown in FIG. 3 folded along a centerline thereof.

The blank 20 for binder 16 is scored along the lateral centerline thereof along a fold line 23, where the blank is folded onto itself 180° to form the completed configuration of the binder 16 as shown in FIG. 4. Thereafter, the juxtaposed surfaces of the binder 16 are pattern glued with a suitable adhesive so as to form the generally rectangular pouches 26 and 27 adjacent respective slots 24 and 25 as shown in broken outline in FIG. 4.

pouches 26 and 27 are adapted to retain interlocking tabs formed on a plurality of interchangeable receiver inserts 30 as described hereinafter in further detail.

Figure 5:
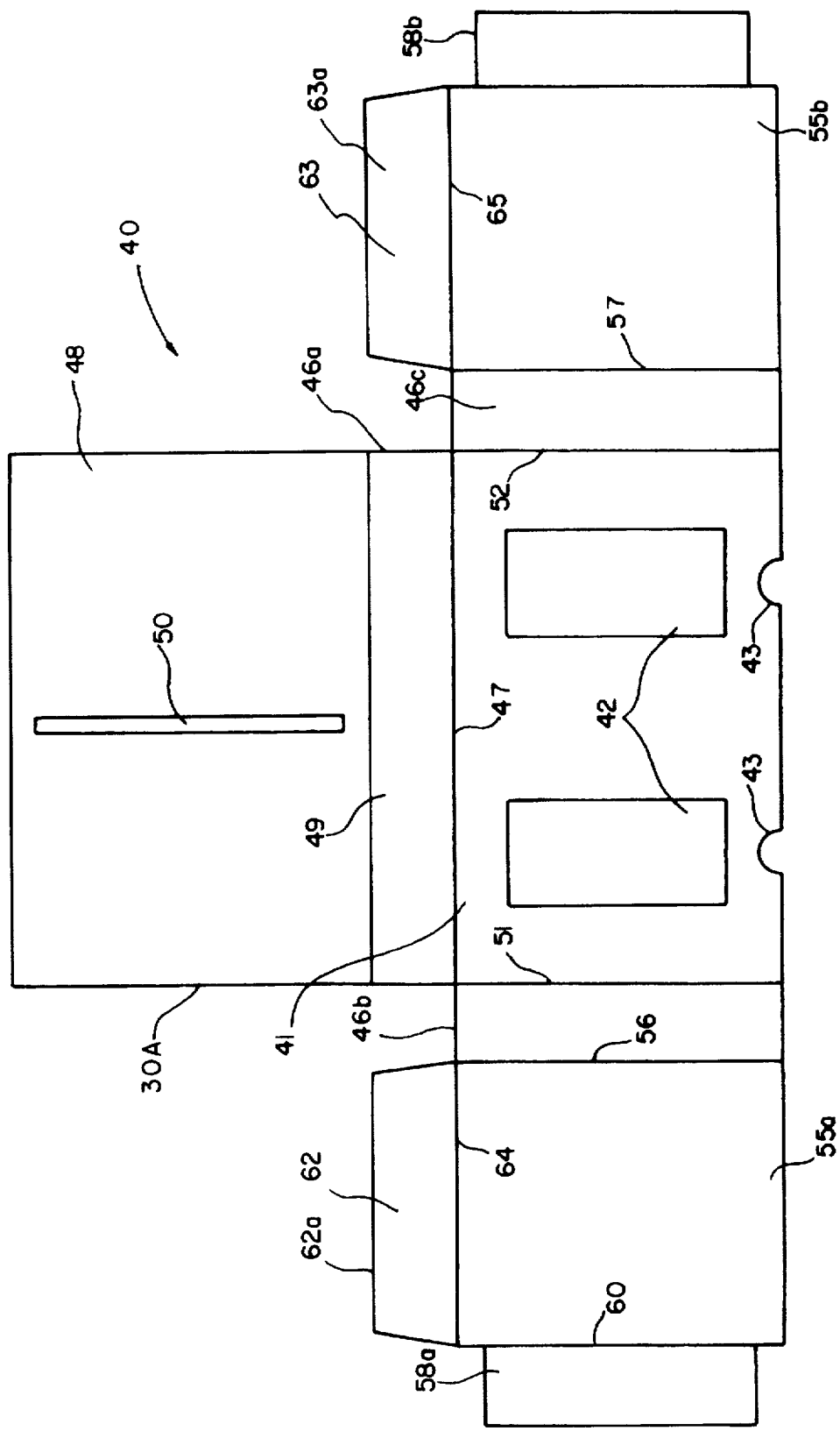
FIG. 5 is a top plan view of a blank for the manufacture of the dual VHS receiver insert shown in FIG. 2.

Turning now to FIG. 5, the details of the construction of the interchangeable receiver inserts 30 will be described. Using a method similar to that described hereinabove for the manufacture of binder 16, the interchangeable receiver inserts 30 may also be fabricated from a single sheet or blank of foldable material such as paperboard for example.

In a first embodiment, the receiver insert 30A adapted to receive a pair of horizontally opposed VHS video cassettes may be fabricated from a single sheet or blank, indicated generally at 40, of foldable material as shown in FIG. 5.

The blank 40 includes at the central portion thereof a generally rectangular top surface 41 including a pair of generally rectangular viewing windows 42 cut therein. Top surface 41 also includes a pair of finger grip cutouts 43 formed in a longitudinal edge of top surface 41 which permit the user the grasp a VHS cassette tape 45 which will be positioned within the completed VHS receiver insert 30A as shown in FIG. 2 for easy removal thereof The opposing longitudinal edge portion of top surface 41 is integrally connected to an adjacent longitudinal edge of a first sidewall portion 46a of insert 30A along fold line 47.

The opposing longitudinal edge portion of first sidewall section 46a is integrally connected to an adjacent longitudinal edge portion of an internal bottom wall 48 along fold line 49.

Internal bottom wall 48 includes a generally rectangular elongated slot 50 which is cut therein being centrally disposed along a lateral centerline of internal bottom wall 48 as shown in FIG. 5.

In a similar manner, the lateral ends of top surface 41 are integrally connected to an adjacent longitudinal edge portion of sidewall sections 46b and 46c along fold line 51 and 52 respectively.

Similarly, the opposing longitudinal edge portions of sidewall sections 46b and 46c are integrally connected to the respective half sections 55a and 55b of an external bottom wall 55 along fold lines 56 and 57. The opposing longitudinal edge portions of half sections 55a and 55b are integrally connected to the adjacent longitudinal edges of partition tabs 58a and 58b which form partition 58 in the completed configuration as shown in FIG. 2.

The lateral ends of the half sections 55a and 55b of the external bottom wall 55 located adjacent sidewall section 46a are integrally connected to an adjacent longitudinal edge portion of locking tabs 62 and 63 along fold lines 64 and 65 respectively.

In order to form the dual VHS receiver insert 30A from the blank 40, the sidewall sections 46a, 46b, and 46c, are folded in generally perpendicular relation to one another along fold lines 47, 51, and 52. Thereafter, the internal bottom wall 48 is folded in generally perpendicular relation to sidewall section 46a so as to lie in a plane generally parallel to and spaced apart from top surface 41.

Next, the respective half sections 55a and 55b of the external bottom wall 55 are folded inwardly in generally perpendicular relation to the respective sidewall sections 46b and 46c along fold lines 56 and 57 to form the generally rectangular, box-like structure of the VHS receiver insert 30A.

Thereafter, the partition tabs 58a and 58b are folded inwardly in generally perpendicular relation to the respective half sections 55a and 55b along fold lines 60 and 61 and are inserted into the slot 50 thereby forming the partition 58 and dividing the dual VHS receiver insert 30A into side-by-side compartments in the completed configuration shown in FIG. 2.

Next, the locking tabs 62 and 63 are folded 180° in juxtaposition to the respective half sections 55a and 55b of the external bottom wall 55 in generally parallel relation thereto.

In order to install the dual VHS insert 30A within binder 16, the distal edges 62a and 63a of locking tabs 62 and 63 are slidably engaged through slot 25 into the underlying pocket 27 to form a completed storage container 15 as shown in FIG. 2.

In the preferred embodiment, detachable fastening means 68 are interposed between an interior surface of rear cover 18 and an outer surface of the external bottom wall 55 to secure the VHS receiving insert 30A in position.

Such detachable fastening means 68 may include, for example, a double-sided adhesive tape sold under the trade name REMO ONE which is particularly well adapted for this purpose having adhesives of two different strengths on the opposed surfaces thereof In the alternative, mating strips of a hook and loop type fastener sold under the trade name VELCRO is also suitable for this purpose.

Since such detachable fastening means are well known to those skilled in the art, further detailed discussion of the same is not deemed necessary.

In the alternative, permanent fastening means such as adhesives can be utilized to secure the receiver inserts 30 within storage containers 15 once a dedicated use for the same has been determined.

Figure 6:
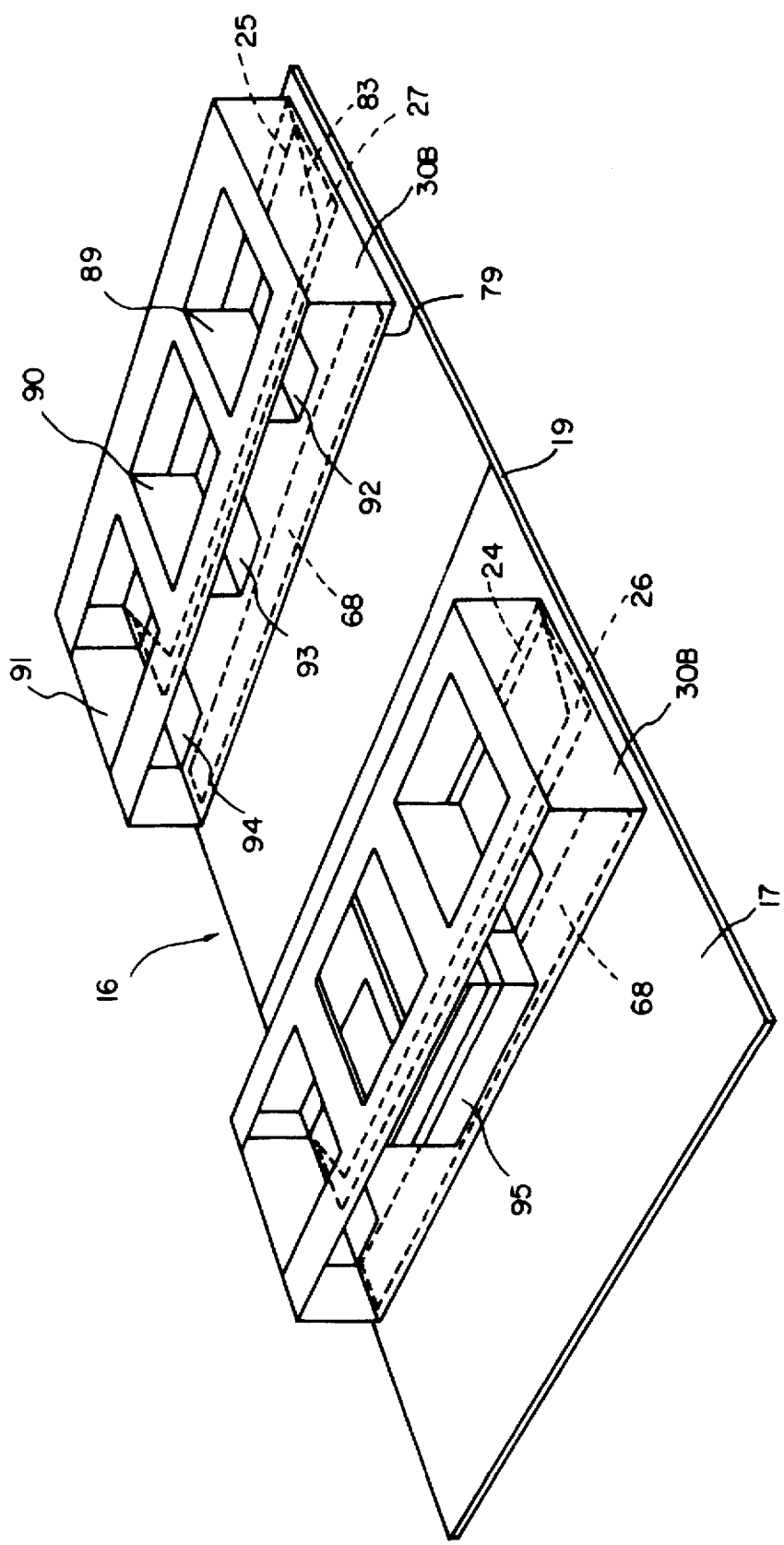
FIG. 6 is a perspective view of an alternative embodiment of the multi-media storage container including a pair of detachable receiver inserts for VHS-C/8 mm video cassettes.
Figure 7:
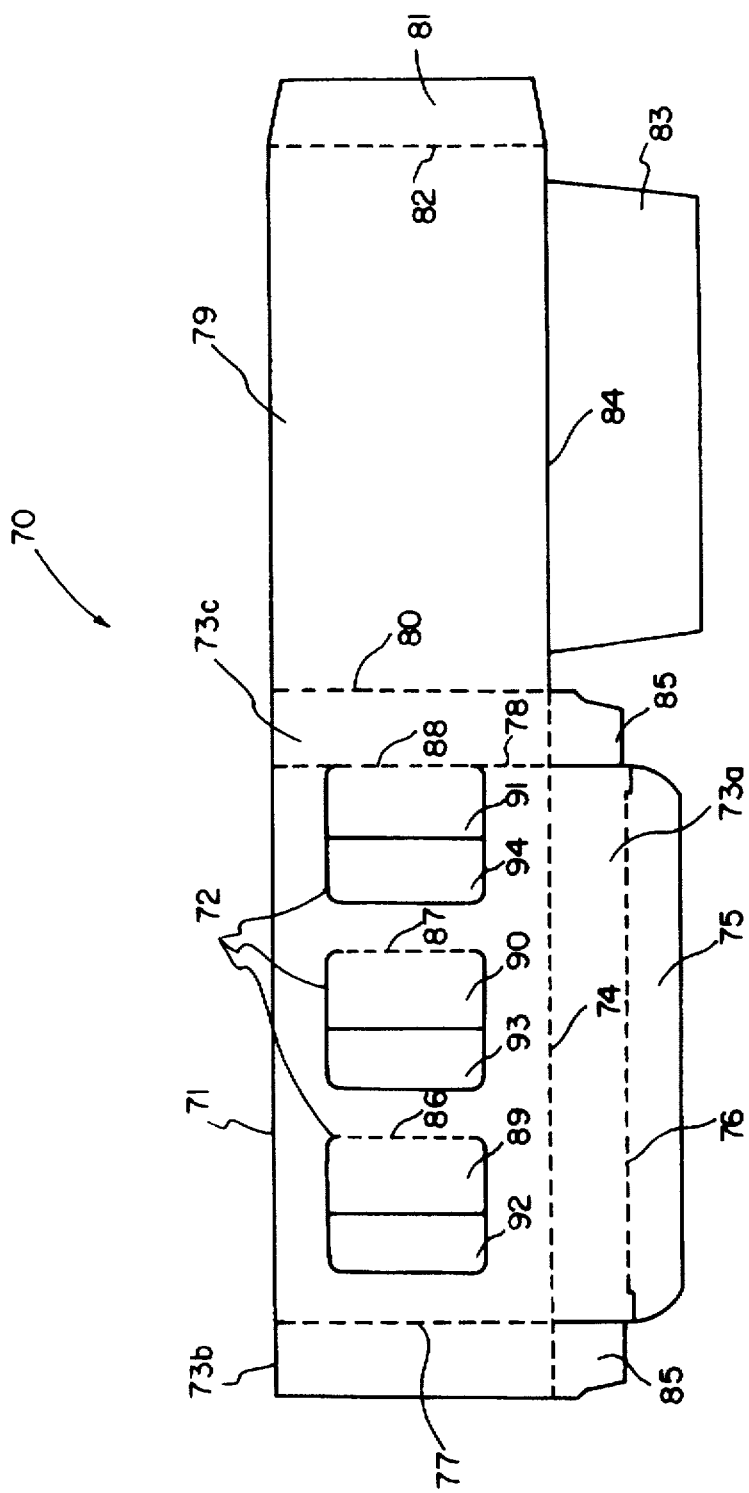
FIG. 7 is a top plan view of a blank for the manufacture of the VHS-C8mm receiver inserts shown in FIG. 6.

Turning now to FIG. 6, the details of the receiver insert 30B for VHS-C and 8 mm video cassettes will be described. As previously stated, the receiver insert 30B may also be fabricated from a single sheet or blank, indicated generally at 70, of foldable material such as paperboard as shown in FIG. 7.

The blank 70 includes a generally rectangular top surface 71 having three cassette viewing windows 72 formed therein in parallel, spaced-apart relation. A longitudinal edge portion of the top surface 71 is integrally connected to an adjacent longitudinal edge of sidewall section a 73a along a fold line 74, where the blank 70 is folded and pivotally connects the top surface 71 to the sidewall section 73a. The opposing longitudinal edge portion of sidewall section 73a is integrally connected to an adjacent longitudinal edge of a folding tab 75 along fold line 76.

In a similar manner, the lateral ends of top surface 71 are integrally connected to adjacent longitudinal edge portions of sidewall sections 73b and 73c along fold lines 77 and 78 respectively, where the blank 70 is folded. The opposing longitudinal edge of sidewall section 73c is integrally connected to an adjacent lateral end portion of bottom surface 79 along fold line 80, where the blank is folded.

The opposing lateral end portion of bottom surface 79 is integrally connected to an adjacent longitudinal edge portion of an adhesive tab 81 along fold line 82, where the blank is folded.

The longitudinal edge portion of bottom surface 79 that is adjacent to the sidewall section 73a is integrally connected to an adjacent longitudinal edge portion of a locking tab 83 along fold line 84 where the blank 70 is folded.

In order to form the multiple VHS-C/8 mm receiver insert 30B, the sidewall sections 73a, 73b, and 73c are folded downwardly in generally perpendicular relation to top surface 71 along fold lines 74, 77 and 78.

Next, the bottom surface 79 is folded in generally perpendicular relation to sidewall section 73c along fold line 80 so as to be disposed in generally parallel, spaced-apart relation to top surface 71.

Next, adhesive tab 81 is folded in generally perpendicular relation to bottom surface 79 along fold line 82 and is secured to an inner surface sidewall section 73b to form a generally rectangular, tubular interim structure which will become the VHS-C/8 mm receiver insert 30B.

Next, the folding tab 75 is folded in generally perpendicular relation to the sidewall section 73a along fold line 76 and together with the interlocking tabs 85 integrally connected to sidewall sections 73b and 73c are folded inwardly to secure the sidewall 73a in position in a known manner.

It will be appreciated that the cutout portions of 89, 90, and 91 of cassette viewing windows 72 remain integrally connected to the top surface 71 along fold lines 86, 87 and 88 where the cutout portions are folded inwardly in generally perpendicular relation to top surface 71 to form a plurality of compartments within the receiver insert 30B as shown in FIG. 6.

It will be appreciated that the distal ends of the cutout portions 89, 90, and 91 of the viewing windows 72 are folded at right angles to form adhesive tabs 92, 93 and 94 to secure the respective partitions 88, 89 and 90 to an inner surface of bottom wall 79 thereby forming the plurality of compartments into which the VHS-C and 8 mm cassettes 95 may be disposed for storage of the same.

In order to install the VHS-C/8 mm receiver insert 30B into the universal binder 16, the locking tab 83 is folded 180° in an overlaying relation with bottom wall 79 so as to be disposed in generally parallel, spaced-apart relation thereto.

Thereafter, an interlocking tab 83 may be slidingly engaged with slots 24 and 25 into the respective pockets 26 and 27 formed within the universal binder 16. It can be seen that a pair of such receiving inserts 30B may be installed within slots 24 and 25 as illustrated in FIG. 6.

Figure 8:
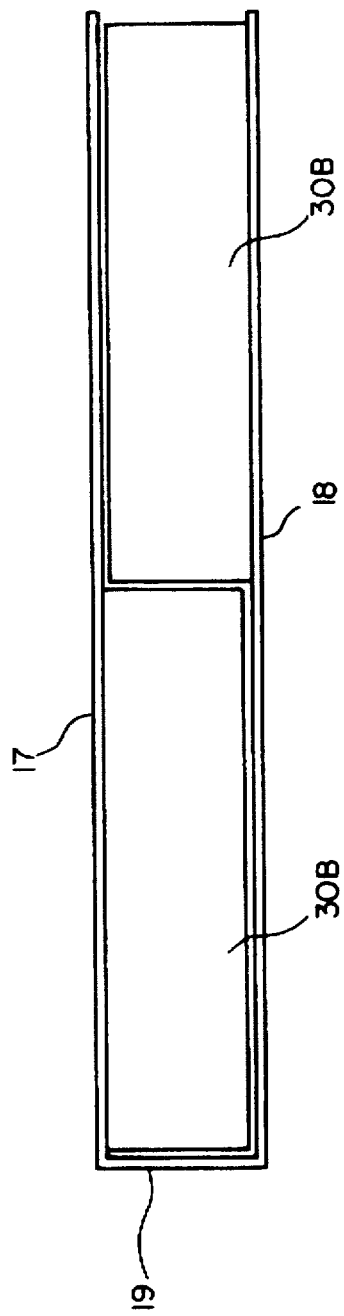
FIG. 8 is a side elevational view of the storage container of FIG. 6 shown in a closed condition.

In this embodiment the pair of VHS-C/8 mm receiver inserts 30B are arranged on the front and rear covers 17 and 18 such that when the storage container is in a folded condition, the pair of receiver inserts 30B lie in side by-side relation so as to maintain a uniform appearance of the storage container 15 as shown in FIG. 8.

In a manner similar to that described hereinabove, detachable fastening means 68 such as double-sided adhesive tape or VELCRO fasteners are interposed between the inner surfaces of front and rear covers 17 and 18 and the bottom wall 79 of the receiving inserts 30B to provide for interchangeability thereof within the universal binder 16.

As can be appreciated from the foregoing, the receiver inserts 30 in accordance with the present invention can be configured and dimensioned to retain various other multi-media cassettes and computer software packages and combinations thereof such as the common philips audio cassette, video tape packages of the familiar Beta and 19 mm video cassettes, digital audio tape (DAT) cassettes, computer software diskettes, and CD-ROMs and their companion protective cases.

Figure 9:
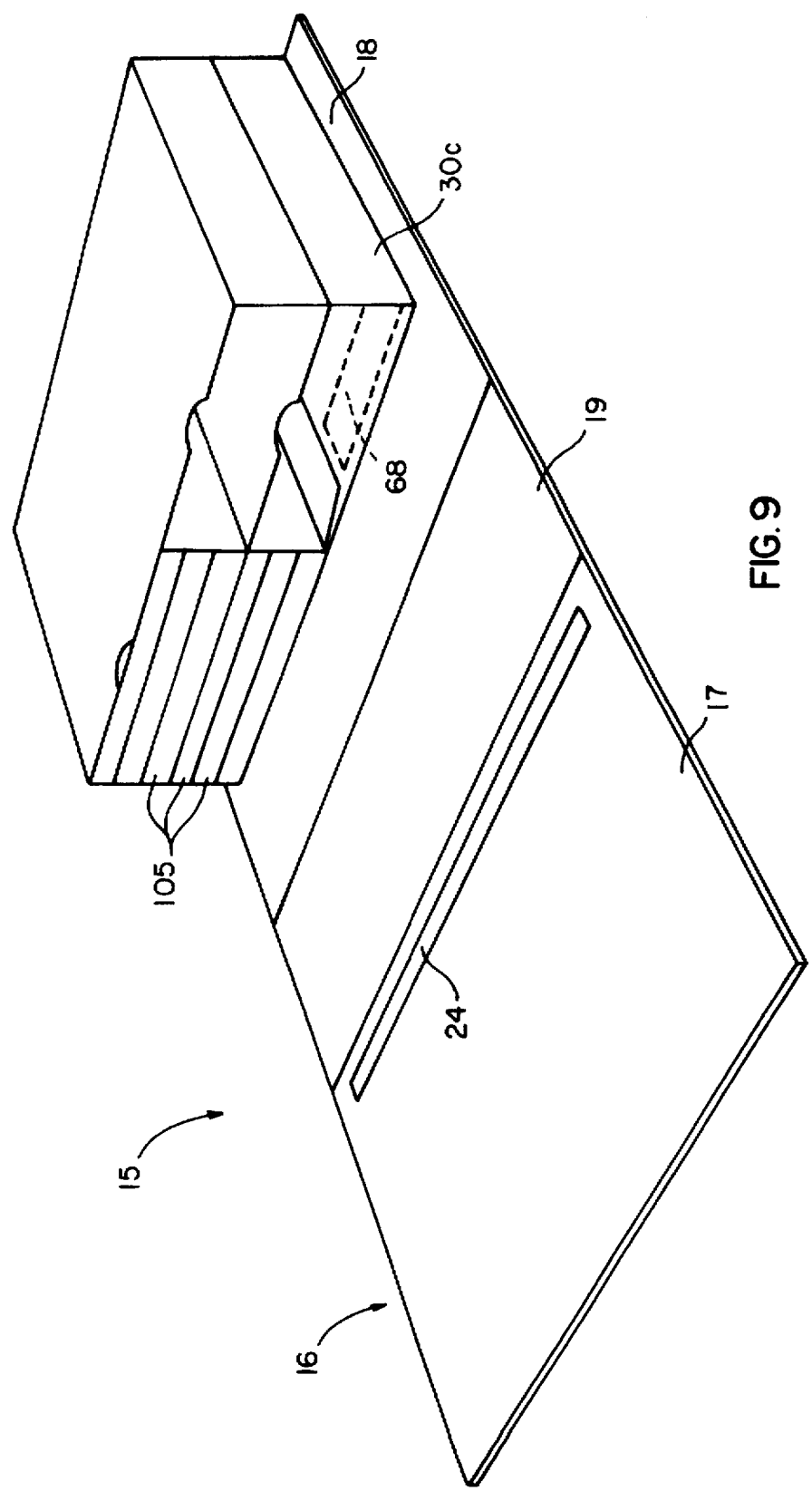
FIG. 9 is a perspective view of an alternative embodiment of the multi-media storage container of the present invention showing a detachable receiver insert for CD-ROMS and computer software diskettes.

For example, FIG. 9 illustrates an alternative embodiment of the storage container 15 of the present invention having a receiver insert 30C for the storage of CD-ROMs and software diskettes and their companion protective cases 105 installed therein.

Figure 10:
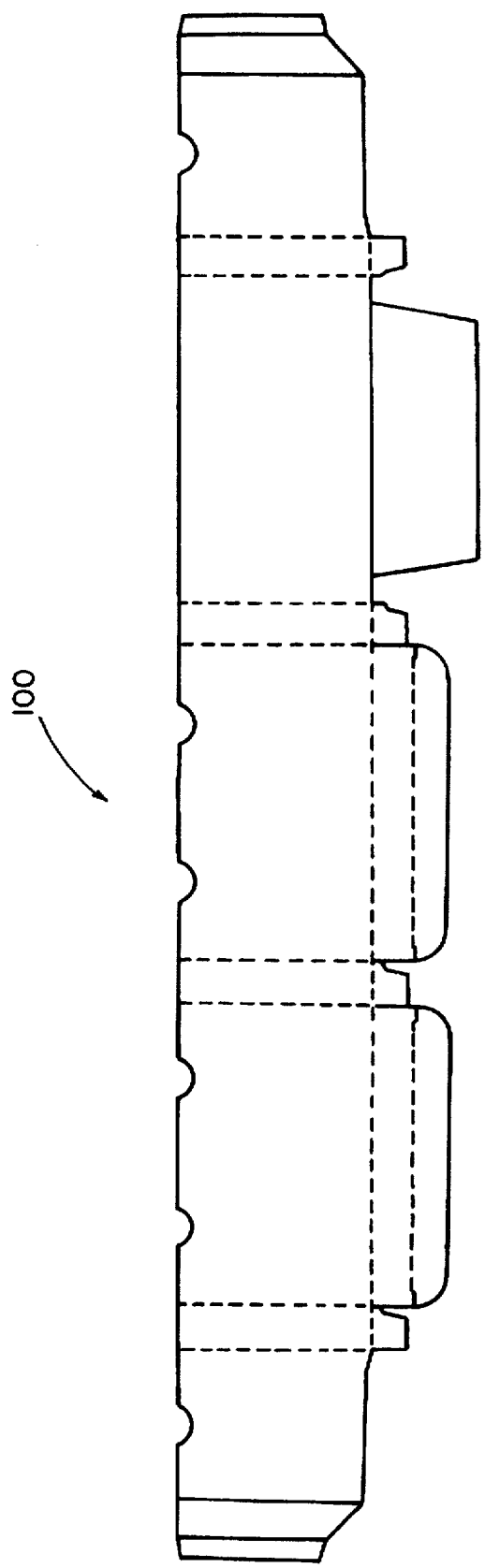
FIG. 10 is a top plan view of a blank for the manufacture of a CD-ROM receiver insert of the present invention shown in FIG. 9.

Referring now to FIG. 10, a blank, indicated generally at 100, is illustrated for the manufacture of the CD-ROM/computer software insert 30C shown in FIG. 9. Using a method similar to that described hereinabove for the fabrication of inserts 30A and 30B, the insert 30C may be constructed.

Of course, various other receiver inserts 30 may be constructed for the storage of differently configured multi-media packages within a single storage container 15 using the techniques described hereinabove.

Figure 11:
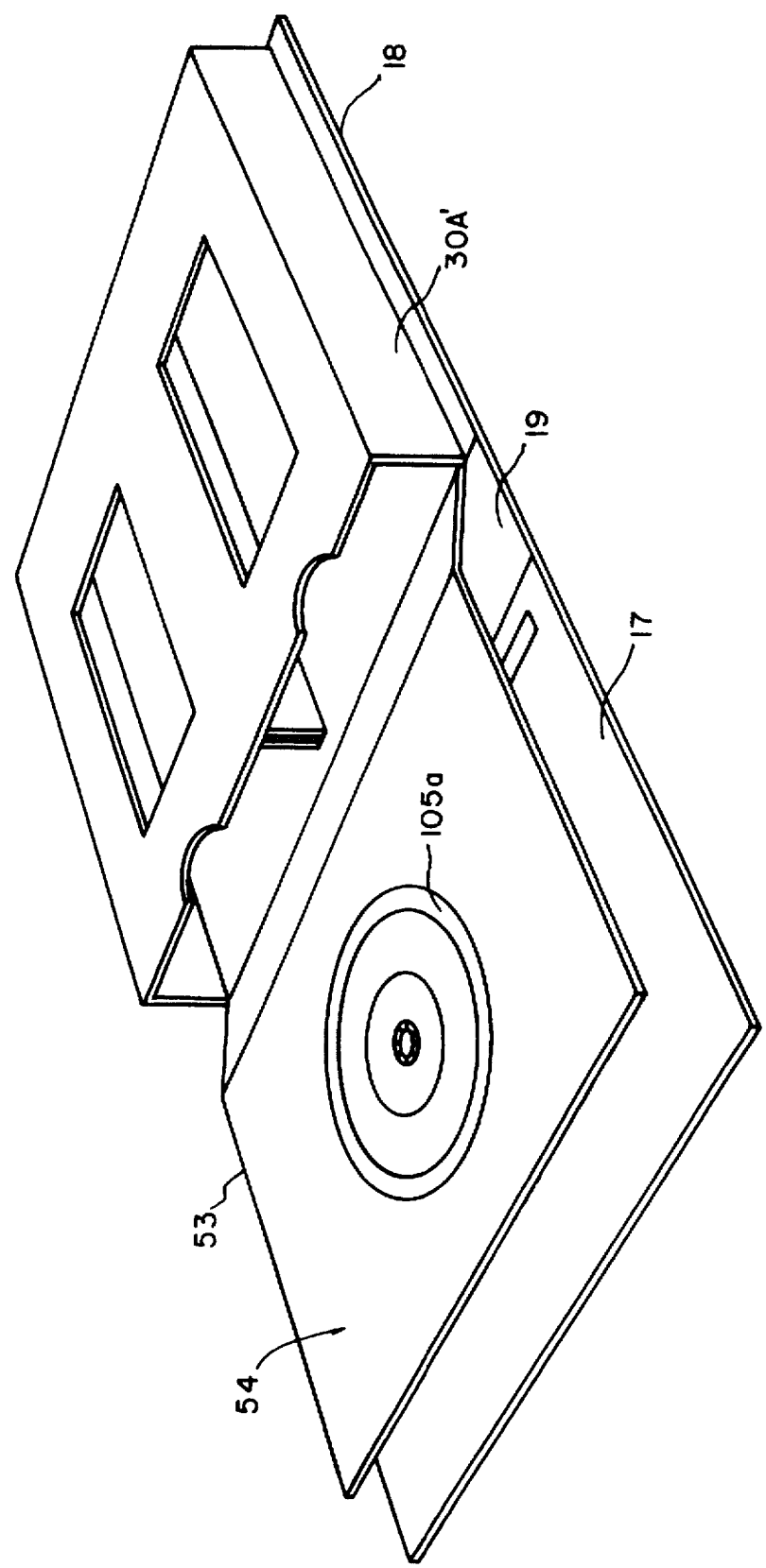
FIG. 11 is a perspective view of an alternative embodiment of the multi-media storage container of FIG. 2 including a detachable receiver insert having an internal cover formed thereon for mounting a CD-ROM.

For example, FIG. 11 illustrates an alternative embodiment of a storage container 15 of the present invention including a receiver insert 30A' adapted for storage of a pair of VHS cassettes 45 and a companion CD-ROM disc 105a.

It will be appreciated that such receiver insert 30A' may be fabricated from a single blank (not shown) of foldable material similar to the blank 40 as shown in FIG. 5 and further including an integral cover extension member 53 that forms an internal cover, indicated generally at 54 as shown in FIG. 11 whereon the CD-ROM 105a is secured for storage.

Figure 12:
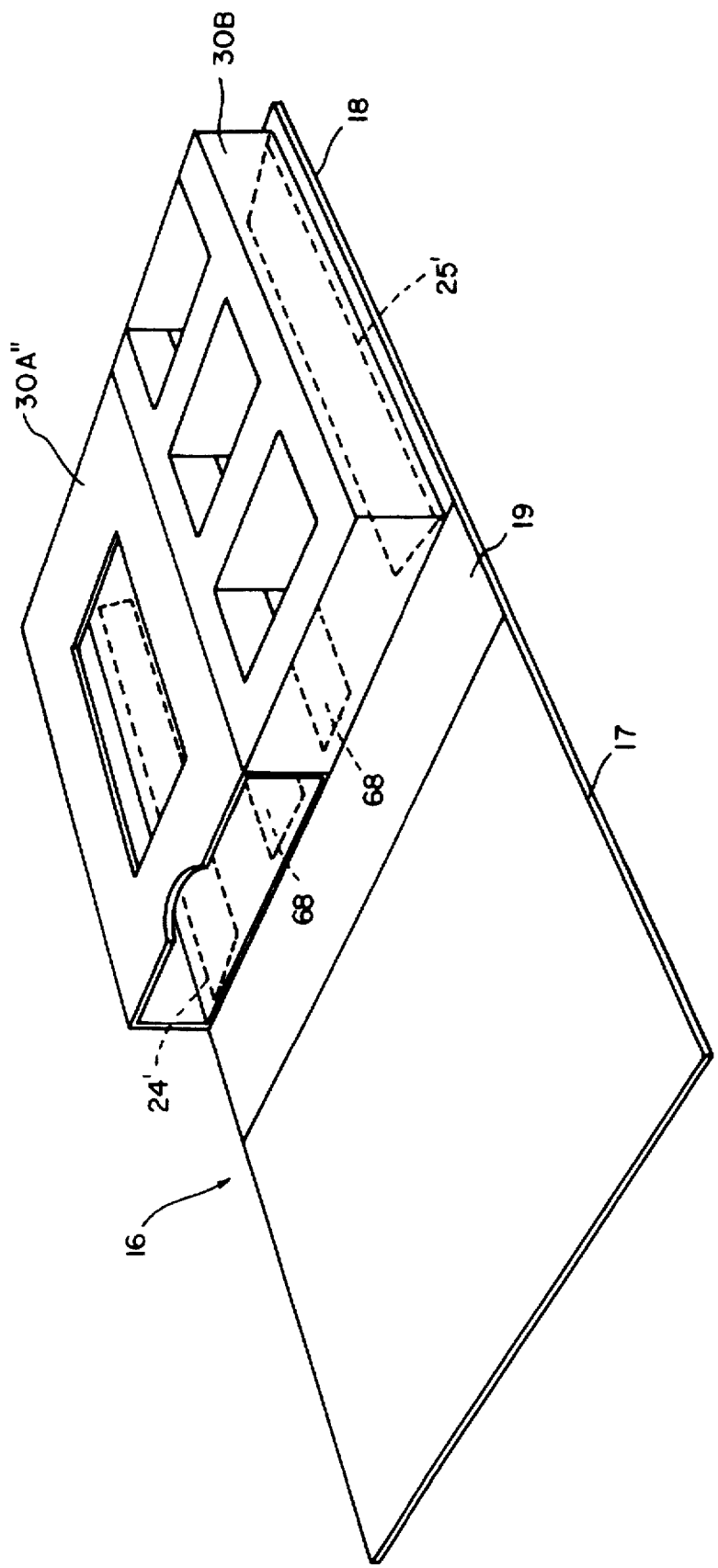
FIG. 12 is a perspective view of an alternative embodiment of the multi-media storage container including detachable receiver inserts for a single VHS cassette and multiple VHS-C cassettes in combination.

As a further example, FIG. 12 illustrates an alternative embodiment of the storage container of the present invention including a single VHS receiver insert 30A" in combination with a multiple VHS-C receiver insert 30B.

In this arrangement the single VHS receiver insert 30A" and the multiple VHS-C receiver insert 30B are installed within a pair of slots 24' and 25', which are both formed in the rear cover 18 of the universal binder 16 as shown in FIG. 12.

In this manner any number of combinations of receiver inserts 30 may be adapted within a single storage container 15 to offer the user a selection of versatile storage configurations within the present system.

The details of the construction of these inserts and other receiver inserts configured for the above multi-media packages (not illustrated) and combinations thereof will not be discussed here in detail since their manufacture is straightforward and reduced to practice and would require no further explanation to those reasonably skilled in this art in view of the present disclosure.

As an alternative to employment of generally rectangular box-like receiver inserts 30 adapted to receive generally rectangular cassette packages of the type illustrated in FIGS. 2–12, a receiver insert 30' of a different form will be described for use with the present invention.

Figure 13:
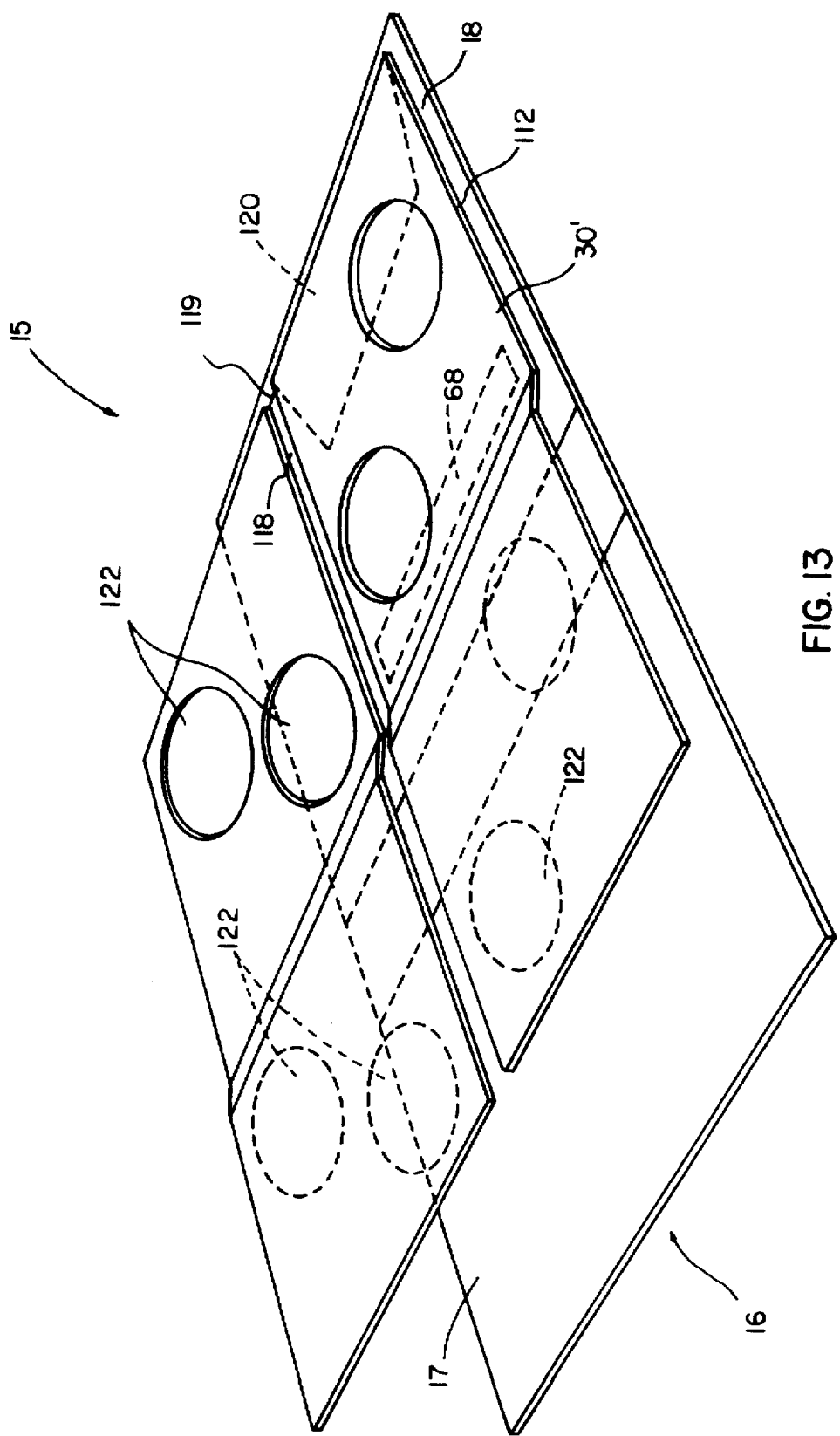
FIG. 13 is a perspective view of an alternative embodiment of a CD-ROM receiver insert for use in combination with the present invention.

Turning now to FIG. 13, there is shown therein a storage container 15 in accordance with the present invention including a receiving insert 30' adapted to receive CD-ROM discs and other multi-media discs having a circular configuration.

Figure 14:
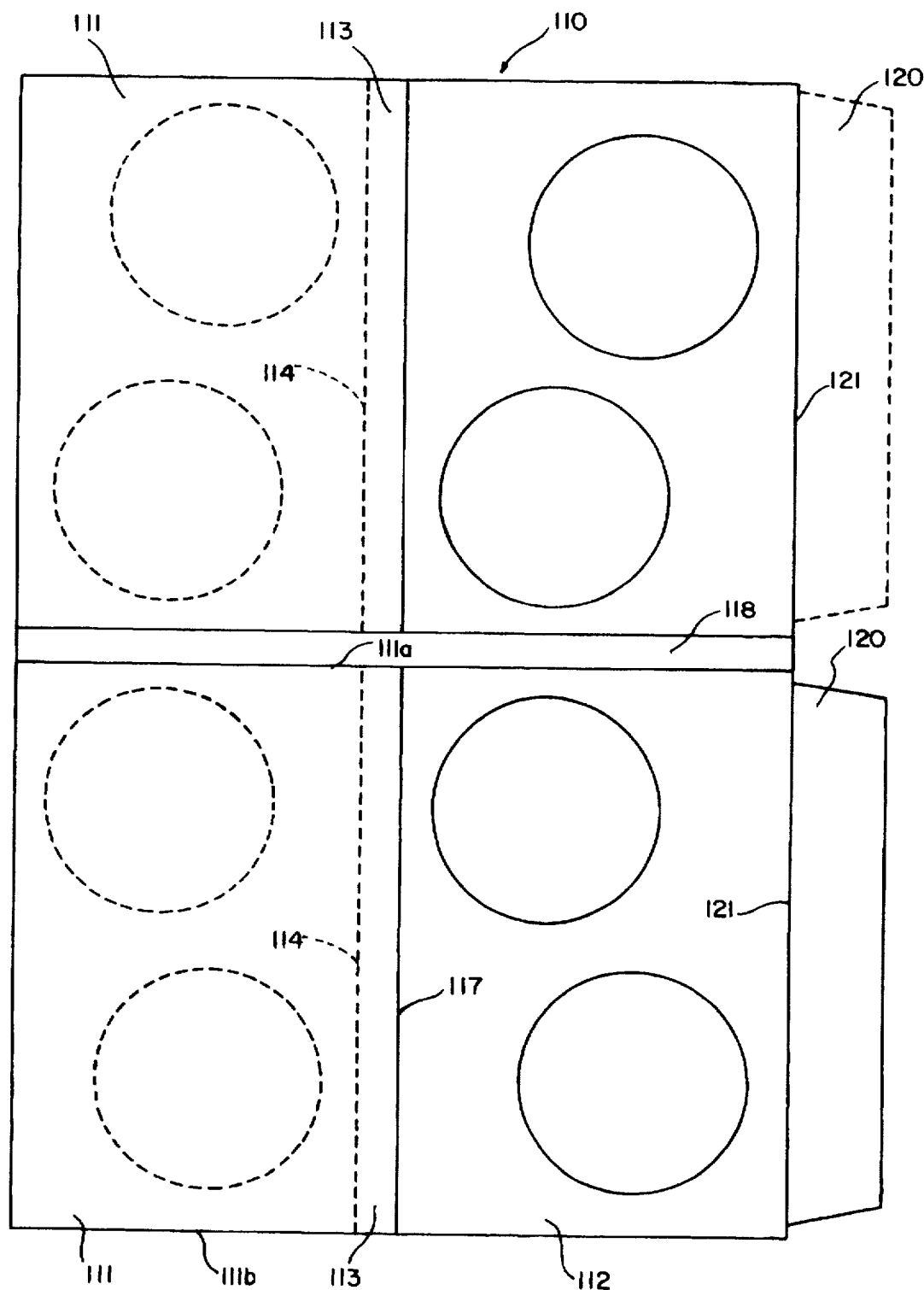
FIG. 14 is a top plan view of a blank for the manufacture of the CD-ROM receiver insert of FIG. 13.

In this alternative embodiment, the receiver insert 30' may be fabricated form a single sheet or blank indicated generally at I 10, of foldable material such as paperboard, for example, as shown in FIG. 14.

The blank 110 includes at one end thereof a front flap 111. An inner longitudinal edge portion of front flap 111 is integrally connected to an adjacent longitudinal edge of hinge panel 1 13 along a cut line 1 14, where the blank 110 is folded and pivotally connects the front flap 111 to the hinge panel 113.

It will be appreciated by those skilled in the art that the cut line 114 does not extend to the entire width of the front flap 111 so that a portion of the front flap 111 intermediate either end of the cut line 114 and the lateral edges 111a and 111b remains intact providing a book-like hinge movement.

The opposing longitudinal edge portion of hinge panel 113 is integrally connected to an adjacent longitudinal edge portion of rear flap 112 along a fold line 117, where the blank 110 is folded 180° to place the front and rear flaps 111 and 112 in overlaying relation.

In the preferred embodiment, a plurality of such receiving inserts 30' are arranged end-to-end relation as shown in FIG. 14.

In this arrangement, the individual receiving inserts 30'are secured together by an adhesive-backed material 118 such as paper, cloth, leather, or other suitable material.

Such material 118 may extend the entire length of the rear flaps 112 disposed end-to-end to provide a finished appearance.

By leaving a gap as at 119 between each respective insert 30', a plurality of adjacent inserts 30' may be folded in an overlaying relationship within a storage container 15.

In a manner similar to that described hereinabove for the receiver inserts 30, the insert 30' is integrally connected along an outer longitudinal edge portion thereof to an adjacent longitudinal edge portion of an interlocking tab 120 along a fold line 121. It will be understood that only a single interlocking tab 120 is required to secure a plurality of such inserts 30'within the universal binder 16. Thus, the interlocking tab 120 formed on the adjacent insert 30' maybe removed as shown in phantom outline in FIG. 14.

In order to install the receiving insert 30'into the universal binder 16, the locking tab 120 is folded 180° along fold line 121 in an overlaying relation with the underside of rear flap 112 and inserted into slots 24 and/or 25 formed within the universal binder 16.

Similarly detachable fastening means 68 such as a double-sided adhesive tape or VELCRO fasteners may be interposed between the inner surface of front and rear covers 17 and 18 of the universal binder 16 and the underside of rear flap 112 of the receiver insert 30' to retain the same within binder 16 for storage.

In this embodiment, both front and rear flaps 1 11 and 1 12 of the insert 30' may be provided with a plurality of cutouts 122 which are configured and dimensioned to accept a variety of disk-shaped or otherwise shaped multi-media packages such as CD-ROMs 105a, computer software diskettes (not shown), and other similar items therein, as shown in FIG. 14.

The configuration and size of the storage containers 15 of the present invention are compatible with existing workstations and shelves 103 found in facilities where such multi-media items are customarily used and facilitate labeling for convenient storage and retrieval. Thus, the present invention is provided with a plurality of self-adhesive labels for identification of the multi-media items contained within each storage container 15.

For example, labels 35 including imprinted indicia (not shown) can be placed on the outside surface of the spine 19 or other convenient surface of binder 16. Such labeling readily permits sighting from a distance, whether the storage container 15 is placed on a workstation or stored away in a common repository.

In a preferred embodiment, labels 35 are adapted for placement within a recessed area formed on the spine 19 and may be embossed to give the appearance of a book binding.

In addition, the multi-media storage system 10 is provided with an index volume 38 wherein a user of the system may identify and catalog the identified multi-media items contained in a particular storage container 15 to facilitate retrieval of such item.

Figure 15:
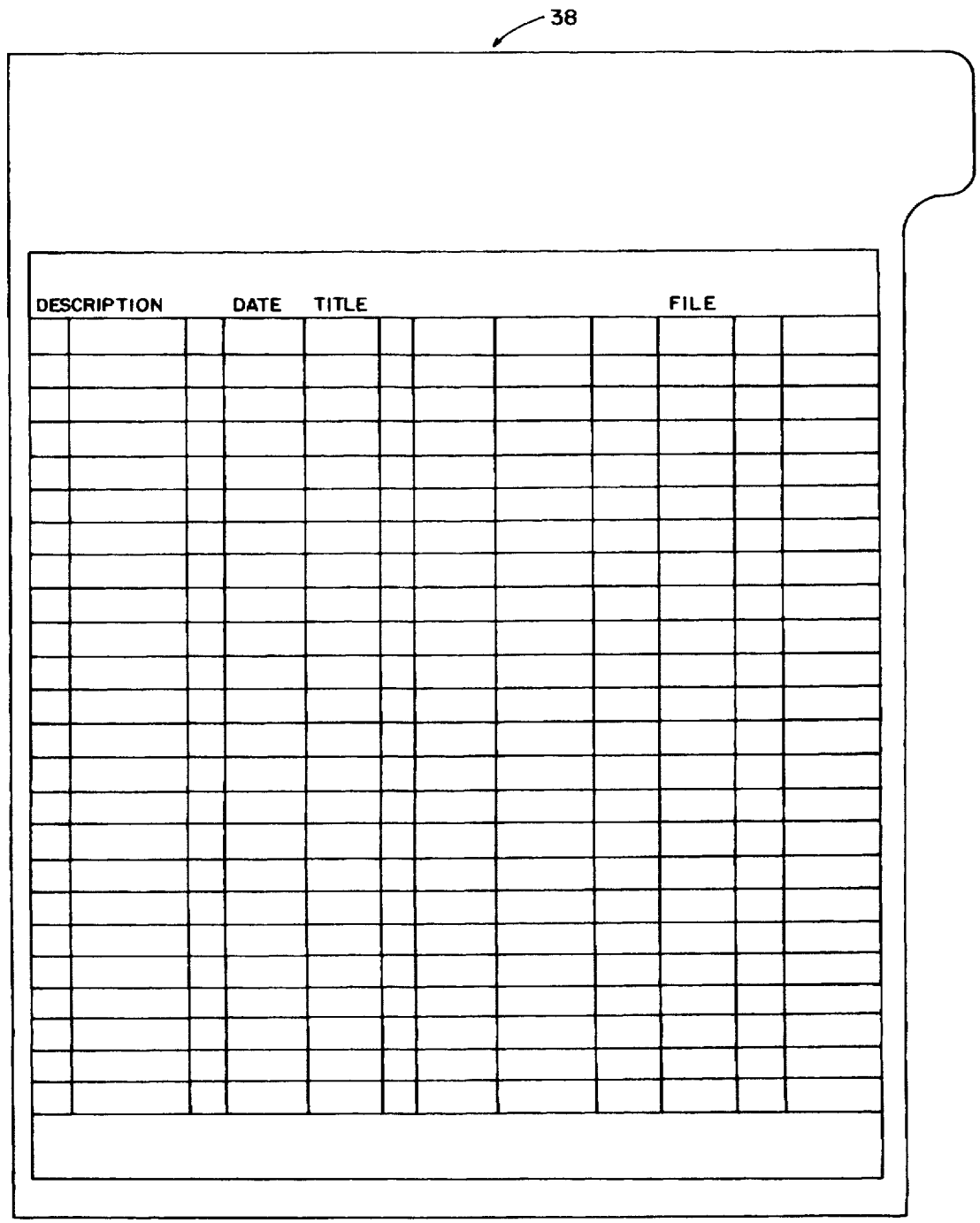
FIG. 15 is a plan view of the companion index volume of the present invention showing the format thereof

The index volume 38 is provided in a conventional alphabetical format wherein the user can catalog each multi-media item stored within the system as shown in FIG. 15. All of these advantages of the multi-media librarial storage system 10 of the present invention counteract the tendency of a consumer to misplace the multi-media items and their companion storage cases.

From the above, it can be seen that the multi-media librarial storage system of the present invention provides a system of great versatility because the individual storage containers offer the user several storage configurations from which to select according to their particular needs.

Further, the multi-media storage system is characterized by efficient use of storage space, compact constriction and an attractive appearance suitable for home or office libraries.

The terms "front", "rear", "side", and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A multi-media librarial storage system for storing, identifying, and organizing a plurality of differently configured multi-media items such as audio and video cassettes, CD-ROMs, computer diskettes, and their protective cases, said system comprising:

at least one storage container means including universal binder having interlocking means formed therein, said universal binder including an area for receiving labeling means thereon, said universal binder being adapted to accept at least one receiver insert means therein;

a plurality of interchangeable receiver insert means having locking tab members formed thereon, said tab members being insertable into said interlocking means so as to attach said insert means within said binder, said insert means including a box-shaped compartment conforming to an external contour of said multi-media items enabling differently configured multi-media items to be received within said insert means and to be interchanged for storage within a single storage container means;

a plurality of labeling means for indentification of said multi-media items within said storage container, said labeling means including preprinted indicia thereon; and an index means including a printed booklet wherein a user of said systems can identify and catalog said multi-media items to facilitate retrieval thereof.

2. The multi-media librarial storage system of claim 1 wherein said universal binder means is fabricated from a single blank of foldable material.

3. The multi-media librarial storage system of claim 2 wherein said foldable material is a paper product such as paperboard.

4. The multi-media librarial storage system of claim 1 wherein said receiver insert means are fabricated from a single blank of foldable material.

5. The multi-media librarial storage system of claim 4 wherein said foldable material is a paper product such as paperboard.

6. The multi-media librarial storage system of claim 1 wherein said universal binder and said insert means are fabricated to simulate the appearance of a book.

7. The multi-media librarial system of claim 1 wherein said interlocking means includes at least one elongated slot formed in an inner surface of said universal binder, said at least one slot receiving at least one of said locking tab members thereby securing said insert means within said binder to form said storage container means.

8. The multi-media librarial storage system of claim 7 wherein detachable fastening means are interposed between said binder and said insert means.

9. The multi-media librarial storage system of claim 1 wherein said receiver insert means include a receptacle for retaining VHS video cassettes and their protective storage cases.

10. The multi-media librarial storage system of claim 1 wherein said receiver insert means include a receptacle for retaining VHS-C video cassettes and their protective storage cases.

11. The multi-media librarial storage system of claim 1 wherein said receiver insert means include receptacle for retaining 8 mm video cassettes and their protective cases.

12. The multi-media librarial storage system of claim 1 wherein said receiver insert means include a receptacle for retaining CD-ROMs and their protective storage cases.

13. The multi-media librarial storage system of claim 1 wherein said receiver insert means include a receptacle for retaining computer software diskettes and their protective storage cases.

14. The multi-media librarial storage system of claim 1 wherein said receiver insert means include a receptacle for retaining digital audio cassettes and their protective storage cases.

15. The multi-media librarial storage system of claim 1 wherein said receiver insert means include a receptacle for retaining magnetic audio tape cassettes and their protective cases.

* * * * *